United States Patent [19]

Gleim

[11] 4,356,301

[45] Oct. 26, 1982

[54] POLYACETYLENE WITH ANTHRAQUINONE SYSTEM

[75] Inventor: Robert D. Gleim, Newtown, Pa.

[73] Assignee: Rohm and Haas Company, Philadelphia, Pa.

[21] Appl. No.: 219,405

[22] Filed: Dec. 22, 1980

[51] Int. Cl.³ .......................... C08K 5/42; C08K 3/30
[52] U.S. Cl. .................................... 528/487; 528/486; 528/488; 528/489; 528/492
[58] Field of Search ............... 525/344, 486; 528/493, 528/487, 495, 488, 492, 489

[56] References Cited

PUBLICATIONS

Stabilization of Linear Acetylinic Polymers, Bartashev, V. A. et al., *Chem. Abst.*, 71, 13816m (1969).

*Primary Examiner*—C. A. Henderson

[57] ABSTRACT

A process for reducing polyacetylene oxidation and embrittlement comprises treating the polyacetylene with a solution of (a) a combination of anthraquinone or an anthraquinone salt, a base and a reducing agent; or (b) pyrogallol; or (c) a hydrosulfiprocess for isomerizing cis-polyacetylene at least partly to trans-polyacetylene comprises treating substantially cis-polyacetylene with a solution of a material which is either (a) a combination of anthraquinone or an anthraquinone salt, a base and a reducing agent; (b) pyrogallol; or (c) a hydrosulfite; and mixtures thereof and wherein the solution is at a temperature of from the freezing point to the boiling point of the solution during the treatment of the cis-polyacetylene and thereafter removing the polyacetylene which has been enriched in the trans form from contact with the solution.

31 Claims, No Drawings

POLYACETYLENE WITH ANTHRAQUINONE SYSTEM

BACKGROUND OF THE INVENTION

Polyacetylene is prepared as disclosed in the Journal of Polymer Science, Volume 12, pages 11 through 20, Shirakawa, et al (1974), and Trans. Faraday Society, Volume 64, pages 823 through 828, Berets, et al (1968). The disclosures of these papers are incorporated herein by reference.

Polyacetylene has valuable electrical properties for a wide variety of uses. However, when polyacetylene is prepared, within a short time after its preparation, the polyacetylene becomes brittle and also loses a portion of its ability to acquire enhanced electrical conductivity properties when doped. Even when a polyacetylene powder is prepared, the ability of such powder to acquire enhanced electrical conductivity decreases after a short period of time and the powder itself becomes modified so that the preparation of formed articles from the powder becomes difficult. One possible explanation for the loss of ability to acquire enhanced conductivity and the embrittlement of a polyacetylene formed material, such as a film, is that the polyacetylene, when prepared at −78° C., is in the form of cis-polyacetylene. However, it is known that cis-polyacetylene, although generally considered stable at temperatures of from about −78° C. to 0° C., does isomerize slowly, even at −78° C., to trans-polyacetylene. At temperatures in excess of 0° C., isomerization of cis-polyacetylene to transpolyacetylene is accelerated. During this conversion, free radicals may be formed which may crosslink or otherwise react with available oxygen. The reaction with available oxygen is believed to contribute to the embrittlement of, for example, a polyacetylene film by the formation of carbonyl and hydroxyl groups. These groups disrupt the conjugation of the polyacetylene double bonds and thereby decrease the ability of the polyacetylene to acquire enhanced electrical conductivity. Whenever cis-polyacetylene is isomerized to trans-polyacetylene, there will always be the formation of free radicals due to the isomerization mechanism. A discussion of the preparation of polyacetylene films and the isomerization of such films is set forth in the Journal of Polymer Science, Volume 12, pages 11 through 20, Shirakawa, et al (1974).

Embrittlement of a cis-polyacetylene film or formed article can be delayed by storing the film or formed article at a low temperature (−78° C. to 0° C.) under an inert gas such as nitrogen, argon or helium.

Although it is known that the cis-polyacetylene is more flexible than the trans-polyacetylene, the trans-polyacetylene has greater intrinsic electrical conductivity properties and the trans- form is thermo-dynamically more stable. The free radicals which may be formed during isomerization of cis- to trans polyacetylene also trap oxygen and reduce the electrical conductivity potential of the polyacetylene (whether cis- or trans- if oxygen is present because it is believed that these free radicals form carbonyl and hydroxyl groups). Although, the state of the art is still such that the formation of these free radicals cannot be eliminated, if the presence of oxygen can be eliminated, then an aggravation of the results of free radical formation can be avoided. Thus, the problems of embrittlement and loss of electrical conductivity potential can be alleviated.

The previous practice of avoiding embrittlement involved preparation of cis-polyacetylene and storage of the cis-polyacetylene at low temperatures of from −78° C. to 0° C. under vacuum or an atmosphere of an inert gas. Such procedures are cumbersome in any practical ambient environment. Therefore, the utility of polyacetylene in applications requiring electrical conductivity is severely limited by the use of those procedures.

Any other approach to the aforesaid problem of the effects of oxygen must take into consideration the affinity of polyacetylene for oxygen. Thus, any material which would remove oxygen from the system must compete with the polyacetylene for the removal of such oxygen and must have a greater affinity for oxygen than the polyacetylene. Stated otherwise, any material which would remove oxygen must be able to compete successfully with polyacetylene for the oxygen present.

The Journal of the American Chemical Society, Volume 46, pages 2639 through 2647, L. F. Fieser (1924), discloses certain aqueous solutions which are useful as absorbents for oxygen in gas analysis. These solutions comprise an anthraquinone salt, a base and a reducing agent. This article also discloses a potassium pyrogallate solution used for comparative purposes and also the use of pyrogallol and the use of a hyposulfite solution. However, this article does not deal with the problem of two substances competing for oxygen and the article is directed to oxygen absorbents in gas analysis and does not teach or suggest the problems set forth herein or any polyacetylene material.

When cis-polyacetylene is available and it is desired to isomerize the cis-polyacetylene, partly or wholly, to trans-polyacetylene, the problem of the presence of oxygen is also encountered in that if oxygen is present, then because the isomerization of cis-polyacetylene to trans-polyacetylene may involve the formation of free radicals which can react with the oxygen to form carbonyl and hydroxyl groups and thereby to adversely affect the electrical conductivity potential, it is important that oxygen be excluded from the polyacetylene when it is being isomerized from the cis form to the trans form. Additionally, the presence of oxygen, during isomerization, leads to more severe embrittlement of the resultant trans-polyacetylene. Oxygen must also be excluded from trans-polyacetylene because of the adverse effect of oxygen on the trans form which causes further embrittlement of the film and reduction of the electrical conductivity potential. The present method of excluding oxygen, namely accomplishing isomerization under an inert atmosphere, is unattractive.

It is an object of this invention, therefore, to reduce polyacetylene crosslinking and embrittlement.

Another object of this invention is to provide a process for substantially preventing oxygen from contacting polyacetylene by providing a material which will successfully compete with the polyacetylene for the available oxygen.

Still another object of this invention is to provide a process for maintaining the electrical conductivity potential of polyacetylene.

A further object of this invention is to provide a process for isomerizing cis-polyacetylene to transpolyacetylene.

Other objects and advantages will become apparent from the following more complete description and claims.

DETAILED DESCRIPTION

Broadly, this invention contemplates a process for reducing polyacetylene oxidation and embrittlement comprising the steps of treating said polyacetylene with a solution, having a pH greater than 7, of a material selected from the class consisting of: (a) a combination of anthraquinone or an anthraquinone salt, a base and a reducing agent; (b) pyrogallol; and (c) a hydrosulfite, and mixtures thereof.

This invention also contemplates a process for isomerizing cis-polyacetylene at least partially to trans-polyacetylene comprising treating substantially cis-polyacetylene with a solution, having a pH greater than 7, of a material selected from the class consisting of: (a) a combination of anthraquinone or an anthraquinone salt, a base and a reducing agent; (b) pyrogallol; and (c) a hydrosulfite, and mixtures thereof, said solution being at a temperature of from the freezing point to the boiling point of the solution during treatment of said cis-polyacetylene, whereby the polyacetylene is enriched in the trans form.

It has now been found that there are some materials and combinations of materials that can act as oxygen scavengers and can compete successfully with the polyacetylene for the oxygen. It has also been found that these same oxygen scavengers can be used to protect the polyacetylene during isomerization of cis-polyacetylene to trans-polyacetylene which may involved elevated temperatures and that the resultant polyacetylene which has been enriched in the trans form will not suffer loss of its electrical conductivity potential due to any free radical reaction with oxygen.

The polyacetylene which is to be protected may be in the form of a powder, film or a foam-like material (hereinafter referred to as a foam). The preparation of polyacetylene foams is described in Journal of Polymer Science; Polymer Letters Edition, Volume 17, pages 779–786, Wnek. Basically, polyacetylene foams may be prepared by polymerizing acetylene gas in the presence of a Ziegler-Natta type catalyst at concentrations that are less than normally employed when forming a film. After the polyacetylene gel is obtained, solvent is removed under vacuum from the gel and the solvent is replaced with benzene. The benzene in the gel is then frozen, and the benzene is then sublimed to prepare the polyacetylene foam.

Regardless of the form of the polyacetylene, the polyacetylene useful in this invention is undoped. The term "doped" means that the polyacetylene has been subjected to a treatment to increase electrical conductivity properties as described in U.S. Pat. No. 4,222,903. The polyacetylenes useful in this invention have not been treated to affect the electrical conductivity properties of the polyacetylene. It is possible however, that the polyacetylene may have some small degree of doping which results from the method of preparation of the polyacetylene and such polyacetylene is also considered undoped.

In the process of this invention, the oxygen scavenger is present in solution in a concentration of at least about 0.01 molar and preferably from about 0.01 M to about 10 M. If the concentration of the oxygen scavenger is less than 0.01 molar, then the polyacetylene will not be adequately protected during prolonged storage.

Although the oxygen scavenger may be present in excess of 10 molar, there is no particular advantage in using such large amounts.

For purposes of the combination of anthraquinone or an anthraquinone salt, a base and a reducing agent, the anthraquinone salt may be considered as the active component and when this combination is used, the molar amounts set forth above which pertain to the concentration of oxygen scavenger present shall be interpreted to refer to the concentration of anthraquinone or anthraquinone salt although the base and reducing agent are also necessary.

Among the oxygen scavengers which may be used because they compete successfully with the polyacetylene film for the available oxygen are a combination of anthraquinone or an anthraquinone salt, a base and a reducing agent; pyrogallol; and a hydrosulfite solution.

When a combination of anthraquinone or an anthraquinone salt, a base and a reducing agent is present, there are certain interrelationships between the anthraquinone or anthraquinone salt, base and reducing agent which will govern the amount of base and reducing agent present.

When scavenging oxygen, the anthraquinone is reduced and it is this reduced form of the anthraquinone or anthraquinone salt which is responsible for preferentially scavenging oxygen. When the anthraquinone or anthraquinone salt is reduced, certain acidic byproducts are formed. If these acidic byproducts are allowed to remain in the scavenging solution, then eventually, the pH of the solution will be below 7 and the solution will no longer be as effective in scavenging oxygen than a solution having a pH greater than 7. When the reduced anthraquinone scavenges oxygen, it is again converted to the anthraquinone or the anthraquinone salt. The base, which is present, functions to remove the acidic byproducts from the solution. However, the base may not be present in an amount which exceeds 50 times the number of moles of anthraquinone present. If the amount of moles of base exceeds 50 times the amount of anthraquinone present, then the solution will not be an effective oxygen scavenger.

The reducing agent may be present in any desired amount. Although it is preferred that the moles of base present be at least equivalent to the number of moles of reducing agent present, there may be an excess of reducing agent present. If there is an excess of reducing agent present, then, even when the supply of base is exhausted, the reducing agent will still function to reduce the anthraquinone or anthraquinone salt to a form which scavenges oxygen although there will then be a build up of acidic byproducts. When acidic byproducts are present in an amount such that the pH of the solution is less than 7, the solution will no longer be as effective as an oxygen scavenging solution than a solution having a pH greater than 7.

Thus, from the above, it is apparent that the number of moles of base present will vary up to 50 times the number of moles of anthraquinone or anthraquinone salt present and that, although it is preferred that the number of moles of reducing agent present equal or be less than the number of moles of base present, the number of moles of reducing agent present may be more or less than the number of moles of base present. In a typical useful scavenging solution, the mole ratio of anthraquinone or anthraquinone salt to base to reducing agent will be from 1 to 28 to 7, respectively.

Additionally, it is also preferred that the reducing agent be present in a large excess, including a saturated solution of the reducing agent.

Typically, for each mole of anthraquinone or anthraquinone salt present, a useful amount of base present will be from about 1 mole to about 50 moles and a useful amount of reducing agent present will be from about 1 mole to about 50 moles.

Among the anthraquinone salts which may be used are anthraquinone β-sulfonate, sodium anthraquinone-β-sulfonate, sodium anthraquinone α-sulfonate; disubstituted anthraquinone sulfonic acid salts such as the 1,5-disulfonic acid salts and the 2,6 disulfonic acid salts and the like. Additionally, anthraquinone itself may also be used.

The base which is used may be a nitrogenous base, including a nitrogenous organic base, or metal hydroxide. The metal hydroxide which may be used may be any metal hydroxide such as sodium hydroxide, potassium hydroxide, calcium hydroxide, ammonium hydroxide and the like. The nitrogenous base may be a primary, secondary or tertiary amine or a quaternary ammonium hydroxide, and the like. Exemplary of such nitrogenous bases are ethylene diamine, tetraethylene pentamine, n-propylamine, 2-hexylamine, tetra-n-butyl ammonium hydroxide, pyridine, diazabicyclo[2.2.2.]octane, and the like.

The reducing agent which is used may be any water soluble or organic solvent soluble reducing agent such as sodium dithionite, sodium borohydride, potassium borohydride, sodium cyanoborohydride; and the like.

Any water or organic solvent soluble hydrosulfite may be used such as sodium or potassium hydrosulfite, and the like despite the fact that sodium hydrosulfite itself tends to be unstable at a temperature in excess of 60° C. During isomerization of cis-polyacetylene to trans-polyacetylene, temperatures in excess of 60° C. may be used.

The solution used as an oxygen scavenger should be at a pH of from about 7 to about 14. If the pH of the solution is less than 7, then the solution will not be maximally effective in preferentially scavenging oxygen.

The temperature of the solution may vary widely from the freezing point of the solution to the boiling point of the solution.

The solvent for the oxygen scavenger may be water and may include a co-solvent such as ethylene glycol, methyl alcohol, ethyl alcohol, dimethyl sulfoxide, tetrahydrofuran, dimethyl formamide, acetonitrile, glyme, diglyme, and the like, which are water miscible. The use of a co-solvent is often advantageous because it enables the use of temperatures in excess of the boiling point of the aqueous solution which contains only water as the solvent for the oxygen scavenger. The term "aqueous solution," as used herein, includes the use of such water miscible co-solvents.

Although aqueous solutions of oxygen scavengers are useful in practicing this invention, it is sometimes preferable to employ an organic solution of the oxygen scavenger. Because the organic solvent used will generally have a lower freezing point than water, employment of an organic solvent enables the polyacetylene to be protected at a lower temperature than does water. Treatment of polyacetylene at a lower temperature is advantageous, when the polyacetylene contains at least some cis-polyacetylene and it is desired to maintain the amount of cis-polyacetylene present, because of the tendency of cis-polyacetylene to isomerize to trans-polyacetylene at higher temperatures. Additionally, when employing water as a solvent, if the temperature of the solution is too low, there is the danger that the oxygen scavenger, which is dissolved in the water, may precipitate out of solution and the value of any precipitated oxygen scavenger would then be lost.

Any organic solvent may be used which will dissolve the desired amount of oxygen scavenger, or combination thereof. Among such organic solvents may be mentioned dimethyl formamide, dimethyl acetamide, N-methyl pyrrolidone, dimethyl sulfoxide, tetrahydrofuran, sulfolane, glyme, diglyme, and the like.

When cis-polyacetylene is being converted, partly or wholly, to trans-polyacetylene, elevated temperatures are generally used although a temperature of from about −78° C. to about 250° C. may also be used. The maximum temperature used is limited only by the boiling point of the solution system used. The temperature used may be increased by the use of greater than atmospheric pressure when isomerizing cis-polyacetylene to trans-polyacetylene.

When protecting a polyacetylene from the effects of oxygen, the polyacetylene in the form of a powder, foam or film is generally immersed in the protective oxygen scavenging solution until such time as it is desired to use the polyacetylene. In a typical protective operation, polyacetylene is immersed in a solution of the oxygen scavenger and the vessel containing the polyacetylene is then sealed to exclude oxygen.

When isomerizing cis-polyacetylene, partly or wholly to the trans form, such isomerization process may be accomplished by immersing the cis-polyacetylene in a protective solution which is at a temperature of from about −78° C. to about 250° C. and preferably from about 0° C. to about 250° C. and maintaining the temperature of the polyacetylene containing protective solution until the desired amount of trans isomer has been obtained as determined by infrared analysis.

The polyacetylene being isomerized may be composed of 100%, by weight, of cis-polyacetylene or may be composed of, for example, 25%, 50% or 75% or more of cis-polyacetylene and, depending upon the amount of cis-polyacetylene originally present and the desired product, the isomerization to trans-polyacetylene may proceed until, for example, the isomerized product is composed of from about 10% trans-polyacetylene to about 100% trans-polyacetylene.

Subsequent to the protection of the polyacetylene with the oxygen scavenging solution or the conversion of cis-polyacetylene, partly or wholly, to trans-polyacetylene, the polyacetylene may be doped to increase its electrical conductivity properties.

In order to more fully illustrate the nature of this invention and the manner of practicing the same, the following examples are presented.

EXAMPLE 1

A solution is prepared by mixing in a beaker containing one liter of water, 200 g. of potassium hydroxide; 150 g. of sodium dithionite; and 20 g. of sodium anthraquinone-beta sulfonate. A deep red solution forms immediately upon the addition of the anthraquinone salt. A strip of cis-polyacetylene film (one inch by 3 inches by 4 mils) is placed in a jar and the solution is added to the jar so that the polyacetylene film is completely immersed in the solution. About 250 cc. of airspace is left in the jar. The jar is then closed, but not hermetically sealed, thereby allowing some air to leak into the jar. The jar is allowed to stand for ten months at room temperature. At the end of ten months the film is removed from the solution and it is sufficiently flexible to be doubled in half without breaking. In contrast with this, both cis-polyacetylene and trans-polyacetylene film exposed directly to air for less than one week, crumbles upon handling.

EXAMPLE 2

A solution of alkaline pyrogallol is prepared by mixing 150 g. of pyrogallol with 1,350 milliliters of a potassium hydroxide solution having a specific gravity of 1.55 and 150 milliliters of water.

A second solution is prepared in the manner of Example 1.

Aqueous solutions containing 20% by weight of oxygen scavengers are prepared. These aqueous solutions are as follows: (1) Irganox 1076 (octadecyl 3-(3,5-di-tertiary-butyl-4-hydroxyl phenyl)propionate.

(2) Irgastab 2002 a hindered phenol containing nickel phosphonate and having the formula Ni-bis[o-ethyl(3,5-di-tertiary-butyl-4-hydroxy benzyl)]

(3) Cyanox 1729 a hindered phenol containing sulfur and manufactured by American Cyanamid Company.

(4) Cyanox 2246, a hindered bisphenol having the formula 2,2'methylene bis(6-tert-butyl-4-methyl phenol).

(5) Cyanox 1735 an alkylidene polyphenol manufactured by American Cyanamid Company.

(6) Methyl ether of hydroquinone dissolved in tetrahydrofuran.

The solutions are all placed in jars and about 250 cc. of airspace remains in each jar. Freshly prepared strips (one inch by three inches by 4 mils) of cis-polyacetylene film are immersed in each of the solutions and the jars are then closed but not hermetically sealed. After one week in the closed, air-containing jars, the films which are immersed in the Irganox 1076; Irgastab 2002; Cyanox 1729, Cyanox 2246; and Cyanox 1735 were all embrittled and crumbled on handling.

After one month, the film in the methyl ether of hydroquinone is also embrittled and crumbles on handling.

The films immersed in the solution of Example 1 and in the alkaline pyrogallol solution remain flexible after 8 months in the jar and show no signs of embrittlement.

EXAMPLE 3

Cis-polyacetylene film is prepared by the method of Shirakawa, et al, Journal of Polymer Science, Polymer Chemistry Edition, Volume 12, pages 11–20 (1974). The cis-polyacetylene film is then thoroughly washed with dry toluene at a temperature of $-78°$ C. and under a nitrogen atmosphere. The film measures 12 inches by 10 inches and is from 2 to 4 mils thick. The film is immediately immersed in a vessel containing the solution prepared as in Example 1. The vessel is then heated to 100° C. and held there for 72 hours. At the end of the 72 hours, a section of the film is removed and analyzed by infrared spectroscopy for isomer content. The film is more than 95% trans-polyacetylene. Additionally, the film is free of carbonyl functional groups as determined by infrared spectroscopy. Additionally, the film remains flexible.

By contrast with the above, a cis-polyacetylene film is prepared as described above and is placed in a vessel and is heated in an air atmosphere at 200° C. for 1½ hours. The resultant film has a high content of trans-polyacetylene and is extremely brittle and crumbles when handled.

EXAMPLE 4

Polyacetylene powder is prepared by the method disclosed in Berets, et al, Trans. Faraday Society, Volume 64, pages 823 through 828. The powder is immersed in a solution prepared in the manner of Example 1 and remains there for four days. The powder is thereafter removed and washed with water and methanol and then dried in vacuo. The powder is then compressed into a disk having a 3 cm. diameter and being 0.4 cm. thick. This disk is then doped with iodine vapor as disclosed in U.S. Pat. No. 4,222,903.

A second disk is prepared in the manner of the first disk except that the powder, from which the second disk is prepared is not immersed in any protective solution and the powder is exposed to the atmosphere for four days prior to preparing the disk.

This second disk is also doped with iodine vapor in the manner of doping of the first disk.

The electrical conductivity of both disks is measured using the procedure set forth in ASTM F-43, as applied to a polyacetylene film. The conductivity is calculated from the test results. The disk made from the powder which had been immersed in a protective solution for four days, exhibits superior conductivity properties when compared to the polyacetylene disk made from unprotected powder.

EXAMPLE 5

In a flask is added 5.0 grams of sodium borohydride dissolved in 50 milliliters of dry N,N dimethyl formamide containing one gram of sodium anthraquinone-beta-sulfonate. 5.0 grams of sodium hydroxide is then added to the flask and a deep red-purple color results. A 5 cm. by 5 cm. by 3 to 4 mil thick section of cis-polyacetylene (greater than 70% cis isomer content) film is immersed in this solution. After 10 months, the film is removed, washed with water, dried and treated with a variety of P-type dopants to produce a film conductivity which exceeds $10^3$ OHM$^{-1}$ cm$^{-1}$. The film remains sufficiently flexible to be doubled in half without breaking. By contrast with the above, a section of film which is not protected by immersion in the oxygen scavenging solution, and is allowed to remain exposed to air, is embrittled within one week.

EXAMPLE 6

The procedure of Example 5 could be repeated except that anthraquinone could be used in place of the sodium anthraquinone beta sulfonate. The solution will be effective in protecting the cis-polyacetylene.

EXAMPLE 7

The procedure of Example 5 could be repeated several times except that the solvent used would be replaced. The solvent which could be used in place of the solvent of Example 5 are N-methyl pyrrolidone, dimethyl acetamide, and ethylene glycol dimethyl ether. In each instance, good results would be obtained.

The process of this invention is not only useful in isomerizing cis-polyacetylene, wholly or partially, to trans-polyacetylene but is also useful in protecting undoped polyacetylene after it has been prepared but before it has been doped. For example, polyacetylene film, powder or foam may be immersed in a protective solution and stored there until it is desired to use or dope the polyacetylene. At that time, the polyacetylene is removed from the protective solution and, if the polyacetylene is to be doped, washed free of the protective solution and then doped. The protective solution may also be used to ship polyacetylene by immersing the polyacetylene in an envelope containing the protective solution and sealing the envelope.

While this invention has been described in terms of certain preferred embodiments and illustrated by means of specific examples, the invention is not to be construed as limited except as set forth in the following claims.

I claim:

1. A process for reducing polyacetylene oxidation and embrittlement comprising the steps of treating said polyacetylene with a solution having a pH greater than 7, of a material selected from the class consisting of:
    (a) A combination of anthraquinone or an anthraquinone salt, a base capable of maintaining a solution pH greater than 7, and a reducing agent capable of reducing anthraquinone or an anthraquinone salt.
2. A process according to claim 1 wherein the anthraquinone concentration in said solution is at least about 0.01 molar.
3. A process according to claim 1 wherein said base is present in said solution in a mole amount of up to about fifty times the number of moles of anthraquinone or anthraquinone salt present.
4. A process according to claim 1 wherein said reducing agent is present in said solution in a concentration of at least the amount necessary to react with the anthraquinone or anthraquinone salt which is present in said solution.
5. A process according to claim 1 wherein the solvent for said material is an aqueous solvent.
6. A process according to claim 1 wherein the solvent for said material is an organic solvent.
7. A process according to claim 6 wherein said organic solvent is substantially anhydrous.
8. A process according to claim 1 wherein said reducing agent is a hydrosulfite.
9. A process according to claim 1 wherein said polyacetylene is a film.
10. A process according to claim 1 wherein said polyacetylene is a powder.
11. A process according to claim 1 wherein said polyacetylene is a foamed material.
12. A process according to claim 1 wherein the solvent for said material is a combination of water and a water miscible cosolvent.
13. A process according to claim 1 wherein said reducing agent is a metal hydride.
14. A process according to claim 1 wherein said base is a metal hydroxide.
15. A process according to claim 1 wherein said base is sodium hydroxide.
16. A process according to claim 1 wherein said anthraquinone salt is sodium anthraquinone-alpha-sulfonate.
17. A process according to claim 1 wherein said anthraquinone salt is sodium anthraquinone-beta-sulfonate.
18. A process according to claim 1 wherein said anthraquinone salt is an anthraquinone disulfonic acid salt.
19. A process according to claim 1 wherein said reducing agent is potassium borohydride.
20. A process according to claim 1 wherein said reducing agent is sodium cyanoborohydride.
21. A process for isomerizing cis-polyacetylene at least partially to trans-polyacetylene comprising immersing said polyacetylene in a solution having a pH greater than 7, of a material selected from the class consisting of:
    (a) A combination of anthraquinone or an anthraquinone salt, a base capable of maintaining a solution pH greater than 7, and a reducing agent capable of reducing anthraquinone or an anthraquinone salt,
said solution being at a temperature of from the freezing point to the boiling point of the solution during treatment of said cis-polyacetylene whereby the polyacetylene is enriched in the trans form.
22. A process according to claim 21 wherein said cis-polyacetylene is in the form of a film.
23. A process according to claim 21 wherein said cis-polyacetylene is in the form of a powder.
24. A process according to claim 21 wherein said cis-polyacetylene is in the form of a foamed material.
25. A process according to claim 21 wherein said cis-polyacetylene being isomerized is at least 25% cis-polyacetylene.
26. A process according to claim 21 wherein said cis-polyacetylene is isomerized to at least 25% trans-polyacetylene.
27. A process for reducing polyacetylene oxidation and embrittlement comprising the steps of treating said polyacetylene with a solution having a pH greater than 7, of a material which is a combination of anthraquinone or an anthraquinone salt, a base selected from the class consisting of metal hydroxide bases or nitrogenous bases and a reducing agent selected from the class consisting of hydrosulfites and metal hydrides.
28. A process according to claim 27 wherein said base is sodium hydroxide.
29. A process according to claim 27 wherein said reducing agent is potassium borohydride.
30. A process according to claim 27 wherein said reducing agent is sodium cyanoborohydride.
31. A process according to claim 27 wherein said reducing agent is sodium dithionite.

* * * * *